United States Patent

Tooma et al.

[11] Patent Number: 5,904,181
[45] Date of Patent: May 18, 1999

[54] PULSATION DAMPENING DEVICE

[75] Inventors: Joseph Tooma, Rochester; Daniel J. Wooster, Ontario, both of N.Y.

[73] Assignee: Eastman Kodak Company, Rochester, N.Y.

[21] Appl. No.: 08/885,491

[22] Filed: Jun. 30, 1997

[51] Int. Cl.[6] ........................................... F16L 55/04
[52] U.S. Cl. ................................... 138/30; 138/26
[58] Field of Search ............................ 138/30, 26

[56] References Cited

U.S. PATENT DOCUMENTS

| | | | |
|---|---|---|---|
| 1,974,323 | 9/1934 | Allen | 138/30 |
| 2,246,621 | 6/1941 | Davis | 138/30 |
| 2,290,337 | 7/1942 | Knauth | 138/30 |
| 2,828,769 | 4/1958 | Cooper | 138/30 |
| 3,628,473 | 12/1971 | Loliger et al. | 138/30 |
| 3,853,147 | 12/1974 | Cibulka | 138/30 |
| 4,088,154 | 5/1978 | Patton et al. | 138/30 |
| 4,186,775 | 2/1980 | Muroi | 138/30 |
| 4,222,414 | 9/1980 | Achener | 138/30 |
| 4,548,240 | 10/1985 | Graham | 138/30 |
| 5,631,632 | 5/1997 | Nakashima et al. | 138/30 |

*Primary Examiner*—Patrick Brinson
*Assistant Examiner*—James F. Hook
*Attorney, Agent, or Firm*—Mark G. Bocchetti

[57] ABSTRACT

A pulsation dampening device designed for horizontal orientation with an internal geometry and a fluid inlet and outlet geometry which minimizes the potential for a preferred flow path thereby allowing for efficient purging of bubbles therefrom. The device includes a generally cylindrical housing containing at least one air chamber. An end cap is attached to the generally cylindrical housing with a diaphragm residing between the end cap and the generally cylindrical housing. The diaphragm normally resides in a generally vertical plane. There is a fluid chamber defined by the diaphragm and the internal surface of the end cap. A horizontally oriented fluid inlet port in the end cap is positioned proximate a bottom peripheral portion of the end cap with the fluid inlet port directed generally perpendicularly to the diaphragm. A fluid outlet port in the end cap is positioned proximate a top peripheral portion of the end cap, the fluid outlet port directed an angle $\alpha$ relative the diaphragm, the angle $\alpha$ ranging from about 110° to about 180°.

13 Claims, 3 Drawing Sheets

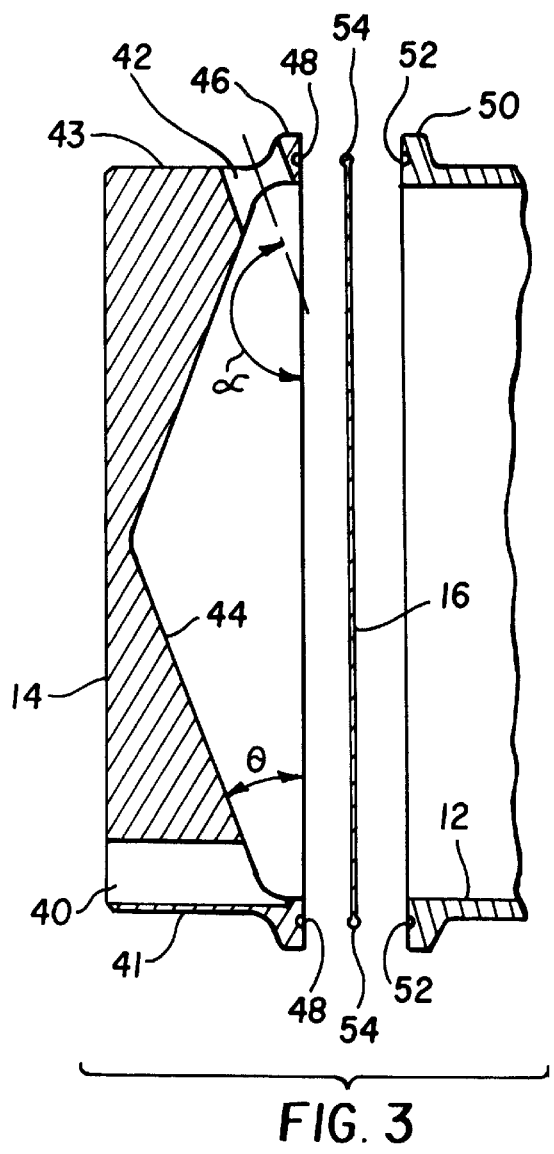
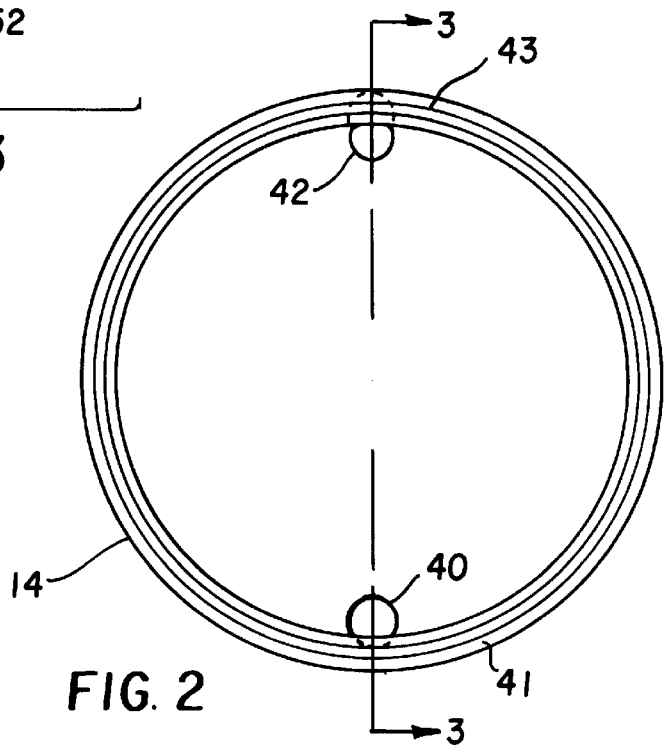

PULSATION DAMPENING DEVICE

BACKGROUND OF THE INVENTION

1. Field of the Invention

The present invention relates generally to pulsation dampeners and, more particularly, pulsation dampening devices which permit adequate purging of bubbles in photographic film and paper coating operations.

2. Brief Description of the Prior Art

In the production of photographic film various coatings are delivered to traveling base webs such as, for example, polyethylene terephthalate and acetate. These coatings often include aqueous solutions of gelatin in which light-sensitive substances have been dispersed. It is important that these coatings be applied evenly to the traveling base web. This is typically done by causing the base web to travel through a coating apparatus such as, for example, a curtain coating apparatus or a bead coating apparatus. It is important to ensure that a stable laminar flow of coating solution is formed by the slide hopper of the coating apparatus. Therefore, pulsation dampening devices are often used in the conduits supplying the coating solution to the coating apparatus.

Numerous devices for pulsation dampening are known in the prior art. Most of such devices are addressed to large pulsations associated with water hammering and shock systems. For example, U.S. Pat. No. 3,628,573 to Lolliger teaches a diaphragm chamber-dampening device with a dished shell for dampening fluid shocks in pipe systems, particularly in the sterilizable pipe systems.

U.S. Pat. No. 4,548,240 to Graham teaches a hydraulic pulse dampener for use in high pressure environments of liquid chromatographs which includes a stiff diaphragm adjacent a recess formed in a receiving member. When the diaphragm is flexed due to absolute increases in pressure or to pressure pulses in the liquid, the diaphragm is capable of nesting in the receiving member.

U.S. Pat. No. 4,222,414 to Achener teaches yet another pulse dampener for use in high pressure liquid pumping applications such as liquid chromatography. The pulse damper includes plastic spools which reside within a housing. Contained within the housing and surrounding the spool is a cavity which can be filled with a compressible liquid.

U.S. Pat. No. 4,186,775 to Muroi teaches a water hammer shock absorber including a housing having a cavity therein adapted to have a pressurized gas seal therein, a perforated pipe passes through the housing with an elastic tube covering the perforated pipe. When there is an occurrence of water hammer within the fluid piping, the pressure waves affected thereby run out through the small perforations in the perforated pipe thereby temporarily deforming the elastic tube. Apparently, the pressure waves are absorbed by means of balancing the force of the pressure waves with the sum of the elasticity of the plastic tube and the pressure to the outside of the elastic tube affected by the pressurized gas within the cavity.

The pulsation dampeners of the prior art are generally vertically oriented meaning that the longitudinal or cylindrical axis of the fluid chamber is vertically oriented and the diaphragm resides in a horizontal plane. It is known that such vertically oriented pulsation dampeners have included multiple air chambers on the opposite side of the diaphragm from the fluid chamber.

Nothing in the prior art teaches a pulsation dampening device which is designed to allow for effective purging in order to deliver bubble free fluid from the device. For film sensitizing applications the ability to purge the dampening device is critical as bubbles delivered in the coating operation result in physical defects in the end product which can make the end product unsuitable for use.

SUMMARY OF THE INVENTION

It is, therefore, an object of the present invention to provide an in-line pulsation dampening device for use in reducing line perturbations in coating operations for the manufacture of photographic materials.

It is further an object of the present invention to provide a pulsation dampening device which allows for the purging of bubbles from the internal cavity of the device, thereby yielding a bubble free fluid at the exit of the device.

Briefly stated, these and numerous other features, objects and advantages of the present invention will become readily apparent upon a reading of the detailed description, claims and the drawings set forth herein. These features, objects and advantages are accomplished by providing a pulsation dampening device having a horizontal orientation and providing the device with an internal geometry and a fluid inlet and outlet geometry which minimizes the potential for a preferred flow path. By having a fluid inlet located at the bottom of the device with the fluid directed perpendicular to the original position of the diaphragm and by locating a fluid outlet at the top of the device which is generally parallel to the plane of the diaphragm, or at least is angled obtusely to the plane of the diaphragm, the device can be effectively purged of bubbles prior to operation.

BRIEF DESCRIPTION OF THE DRAWINGS

FIG. 2 is an end view of the cap end of the pulsation dampening device of the present invention with the nozzles removed.

FIG. 3 is an exploded, cross sectional view taken along 3—3 of FIG. 2.

DETAILED DESCRIPTION OF THE PREFERRED EMBODIMENTS

Figure 1:
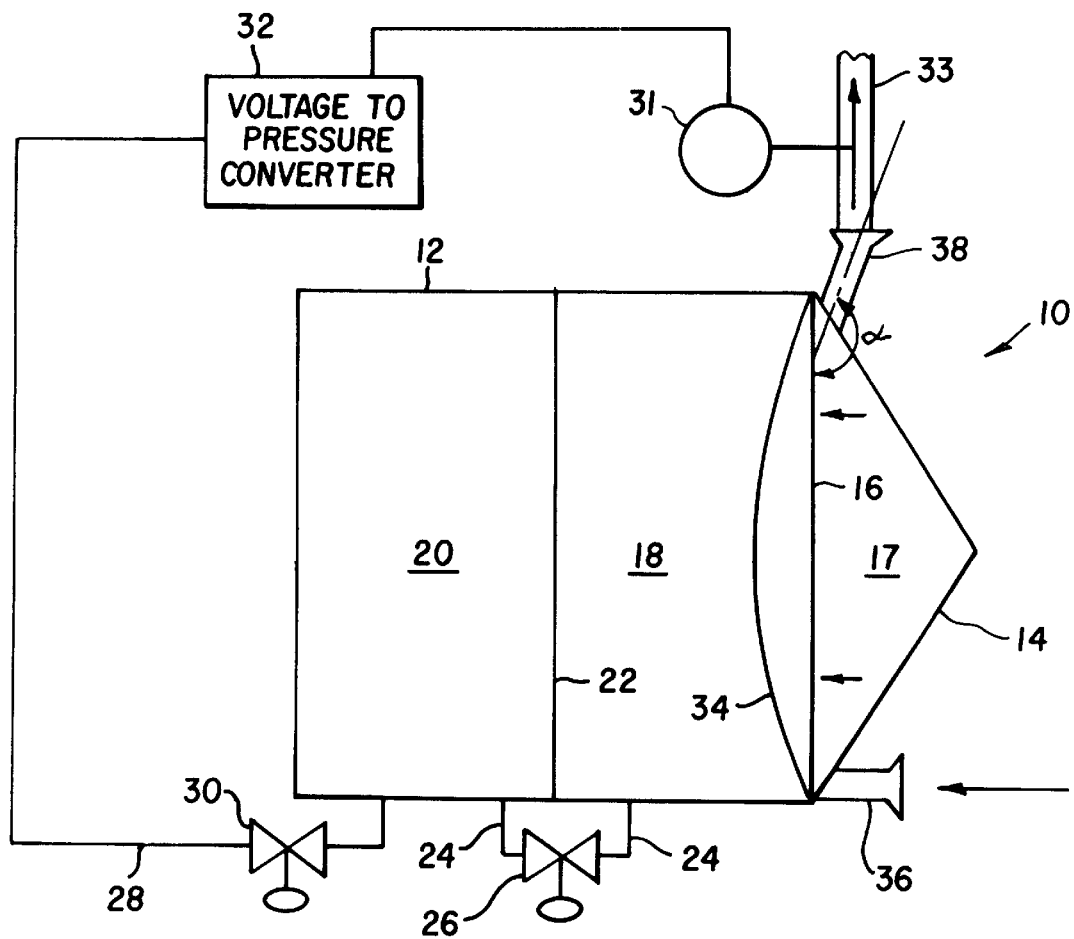
FIG. 1 is a schematic side elevational view of the pulsation dampening device of the present invention.

Turning first to FIG. 1 there is shown a schematic side elevational view of the pulsation dampening device 10 of the present invention. The pulsation dampening device 10 includes a housing or shell 12 which is preferably generally cylindrical in shape. Housing or shell 12 is coupled to a cap 14. Residing between the cap 14 and shell 12 is diaphragm 16. There is a fluid chamber 17 defined by diaphragm 16 and the internal surface of cap 14. Diaphragm 16 is made from an elastomer such as, for example, polyisoprene. Cylindrical shell 12 is preferably divided into a first air chamber 18 and a second air chamber 20 by means of plate 22. Conduit 24 with valve 26 residing therein allows for fluid communication between first air chamber 18 and second air chamber 20. Conduit 28 having valve 30 residing therein allows for fluid communication between second air chamber 20 and voltage to pressure converter 32. Voltage to pressure converter 32 receives a voltage response signal from pressure transducer 31 in conduit 33 and converts that response signal to an equal pressure. Voltage to pressure converter 32, which is connected to a source of compressed air (not shown) regulates air flow to chambers 18, 20. An example of a voltage to pressure converter 32 which can be used in the operation of the present invention is the Bellofram 1001EP as manufactured by Bellofram, Corp. of Newell, W.Va. Valves 26, 30 allow for manual or automatic adjustment of how diaphragm 16 responds to pulses and perturbations in the flow of liquid to fluid chamber 17. Although a single chambered cylindrical shell 12 could be used, dividing cylindrical shell 12 into two air chambers 18, 20 allows for greater flexibility in tuning or adjusting the pulsation dampening device of the present invention with valves 26, 30 to achieve better control for a specific application. Valves 26, 30 are manually adjusted to maximize pulsation reduction performance of the device based on the specific conditions of the process in which the device has been installed. In actuality, valves 26, 30 regulate the air flow to and from chambers 18, 20. For an application with generally static process conditions, it would be possible to delete valves 26, 30 and accomplish the desired regulation of air flow to and from chambers 18, 20 through the sizing of conduits 24, 28, or by placing restriction orifices in conduits 24, 28.

Positioned within first air chamber 18 is restraining plate 34 which is in the shape of a partial sphere and serves as a limit to the amount of deflection that can be imparted to diaphragm 16. Restraining plate 34 is necessarily perforated or slotted to allow air to freely flow therethrough. Cap 14 has a fluid inlet nozzle 36 extending therefrom. The cylindrical axis of fluid inlet nozzle 36 is generally perpendicular to the plane of diaphragm 16 when diaphragm 16 is in its normal, undeflected position. Fluid inlet nozzle 36 is positioned proximate to the bottom of pulsation dampening device 10. Extending from a position near the top of cap 14 is fluid outlet nozzle 38. Conduit 33 is connected to fluid outlet nozzle 38. The cylindrical axis of fluid outlet 38 should be parallel to, or at least obtusely angled from the plane of diaphragm 16 at an angle α when diaphragm 16 resides in its normal, undeflected position. Angle α can be in the range of from about 110° to about 180°.

Turning to FIG. 2, there is shown an end view of the preferred embodiment for cap 14. End cap 14 includes an inlet opening or port 40 positioned proximate to a bottom peripheral portion 41 of cap 14 and an outlet opening or port 42 positioned proximate to a top peripheral portion 43 of cap 14. Inlet opening 40 would receive fluid inlet nozzle 36 and outlet opening 42 would receive fluid outlet nozzle 38.

Looking next at FIG. 3, it can be seen that cap 14 preferably includes an interior surface 44 which is generally conical. Cap 14 includes a flange 46 in which there is an annular recess 48. The angle θ of the conical surface 44 should be in the range of from about 5° to about 45° from the base of flange 46 and is preferably about 20° from the base of flange 46.

Shell 12 includes a flange 50 having an annular recess 52 therein. Diaphragm 16 includes an O-ring portion 54 about the periphery thereof. O-ring portion 54 resides in annular recess 48 and annular recess 52 when cap 14 is connect to shell 12. Cap 14 can be connected to shell 12 by a variety of means. Preferably, cap 14 is clamped to shell 12 using a Tri-Clamp® assembly (not shown).

FIG. 3 shows a generally conical interior surface 44, which is the preferred geometry for such surface. However, it will be appreciated that it is possible to use other internal geometries for the interior surface 44 of end cap 14. For example, it is believed that the pulsation dampening device of the present invention will work with an interior surface 44 which is spherical, aspherical or frusto-conical in shape, or perhaps semi-cylindrical. For the purposes of this application, the term "concave internal surface" is intended to include internal surfaces 44 which are conical as well as such alternative geometries as mentioned above. For higher flow rates and depending on the volume of fluid chamber 17, it is possible that interior surface 44 can be generally flat such that fluid chamber 17 becomes generally cylindrical in shape.

The pulsation dampening device 10 of the present invention is designed for horizontal orientation. With the fluid inlet nozzle 36 positioned at the bottom center of cap 14 such that the fluid flow therefrom is directed horizontally into the pulsation dampening device 10 and substantially perpendicular to the plane of diaphragm 16 in its normal, undeflected position, the potential for a preferred flow path through the device 10 to the fluid outlet nozzle 38 is minimized. Rather, the flow distribution of the fluid in fluid chamber 17 will tend to distribute evenly. Further, with the fluid outlet nozzle 38 positioned proximate top center of cap 14, the potential for bubble traps is minimized. The combination of the position of fluid outlet nozzle 38 and the even flow distribution in fluid chamber 17 minimizes the potential for low flow zones within fluid chamber 17. In such manner, the ability to purge bubbles from fluid chamber 17 is greatly enhanced. By purging fluid chamber 17 prior to applying coatings to the base film web, the possibility of creating off spec product due to bubbles being delivered to the coating hopper is greatly reduced.

For flow rates in the range of from about 0.1 to about 25 kg/min. the volume of fluid chamber 17 should be in the range of from about 50 cc to about 1000 cc, and the volumes of first and second air chambers 18, 20 should each be in the range of from about 500 cc to about 4000 cc. The nominal diameter of shell 12 should be in the range of from about two inches to about ten inches, and the diameters of inlet opening 40 and outlet opening 42 should each be in the range of from about one-sixteenth of an inch to about one inch.

Figure 4:
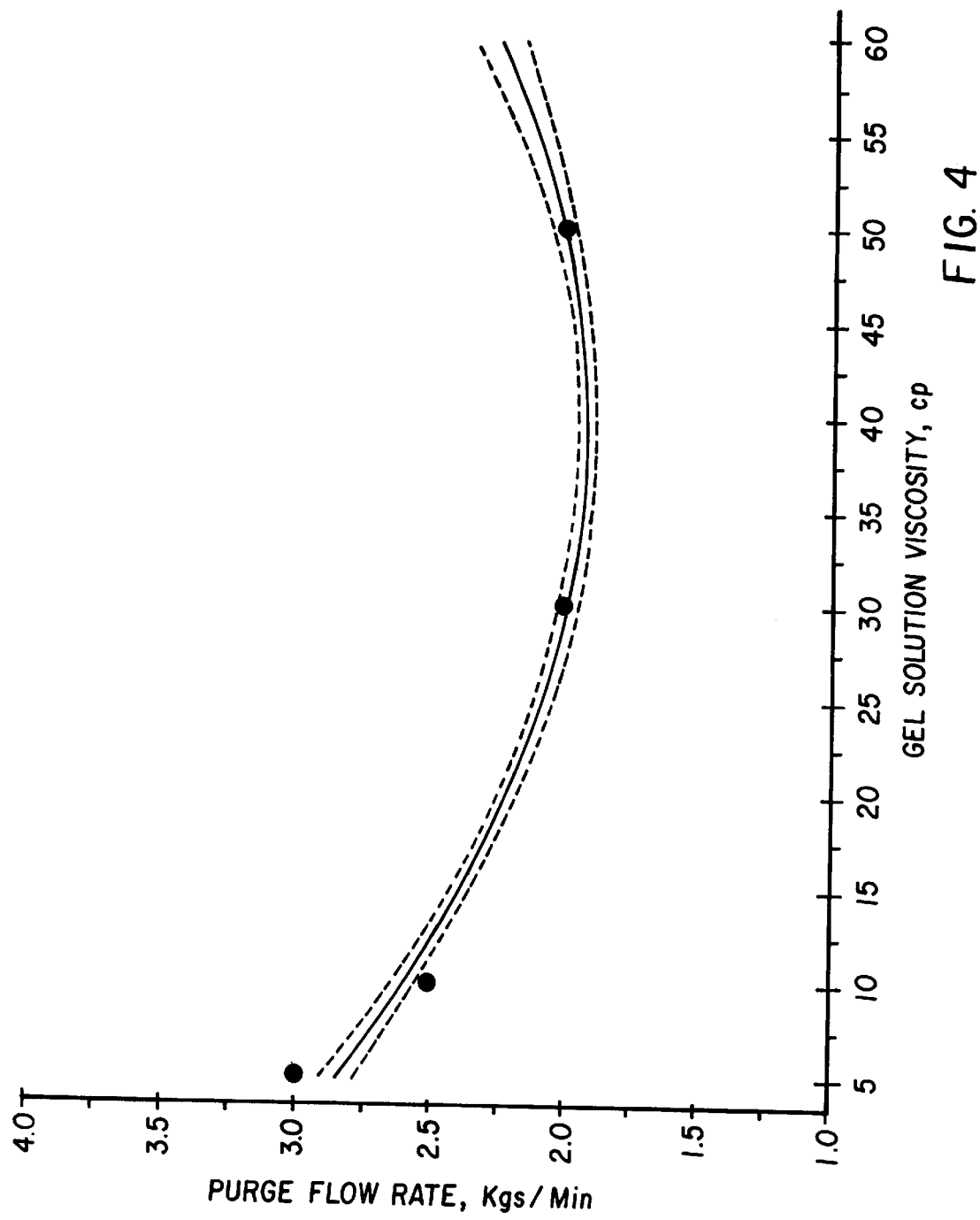
FIG. 4 is a purge map for pulsation dampening device of the present invention plotting purge flow rate versus gel solution viscosity.

Looking at FIG. 4, there is shown a purge map for the pulsation dampening device 10 of the present invention. This purge map plots fluid viscosity in centipoise versus required purge flow rate (kg/min). The 95 percent confidence interval bands for the purge map model are on the mean predicted values. The purging flow rate depicted in the purge map was selected based on consistent purging performance at various flow and viscosity conditions. The purging efficiency of the dampener of the present invention at a given flow rate was studied with and without back pressure as well as with and without activating a pressure control loop. The flow rate that consistently purged out bubbles regardless of the above conditions was selected and included in the purge map. The table below is a summary of the required purged rates for the gel solution viscosities that were studied for a fluid chamber 17 having a volume of about 250 cc.

TABLE

| Solution Viscosity (cp) | Required Purge Flow Rate (kg/min.) |
| --- | --- |
| 5 | 3.0 |
| 10 | 2.5 |
| 30 | 2 |
| 50 | 2 |

From the foregoing, it will be seen that this invention is one well adapted to attain all of the ends and objects above set forth together with other advantages which are apparent and which are inherent to the device.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matters herein set forth and shown in the accompanying drawings is to be interpreted as illustrative and not in a limiting sense.

What is claimed is:

1. A pulsation dampening device with a high bubble purging efficiency comprising:
   (a) a housing containing at least one chamber and having a longitudinal axis, said housing having a closed end and an open end, said housing positioned such that said longitudinal axis of said housing is approximately horizontal;
   (b) an end cap attached to said open end, said end cap having an internal conical surface;
   (c) a diaphragm residing between said end cap and said housing, said diaphragm normally residing in a generally vertical plane;
   (d) a fluid chamber defined by said internal surface and said diaphragm;
   (e) a fluid inlet port in said end cap positioned proximate a bottom peripheral portion of said end cap, said fluid inlet port directed generally perpendicular to said generally vertical plane; and
   (f) a fluid outlet port in said end cap positioned proximate a top peripheral portion of said end cap, said fluid outlet port directed an angle α relative said generally vertical plane, said angle α ranging from about 110° to about 180° said end cap, said fluid inlet, said fluid outlet, and said diaphragm resulting in a distributed, non-preferred flow path through said fluid chamber.

2. A pulsation dampening device as recited in claim 1 wherein:
   said housing is generally cylindrical in shape.

3. A pulsation dampening device with a high bubble purging efficiency comprising:
   (a) a housing containing at least one chamber and having a longitudinal axis, said housing having a closed end and an open end, said housing positioned such that the longitudinal axis of said housing is approximately horizontal;
   (b) an end cap attached to said open end, said end cap having an internal concave surface;
   (c) a diaphragm residing between said end cap and said housing, said diaphragm normally residing in a generally vertical plane;
   (d) a fluid chamber defined by said internal surface and said diaphragm;
   (e) a fluid inlet port in said end cap positioned proximate a bottom peripheral portion of said end cap, said fluid inlet port directed generally perpendicular to said generally vertical plane; and
   (f) a fluid outlet port in said end cap positioned proximate a top peripheral portion of said end cap, said fluid outlet port directed generally upward, said end cap, said fluid inlet, said fluid outlet, and said diaphragm resulting in a distributed, non-preferred flow path through said fluid chamber.

4. A pulsation dampening device as recited in claim 3 wherein:
   said fluid outlet port is angled obtusely with respect to said generally vertical plane.

5. A pulsation dampening device as recited in claim 3 wherein:
   said fluid outlet port is parallel to said generally vertical plane.

6. A pulsation dampening device as recited in claim 3 wherein:
   said fluid outlet port directed an angle α from said generally vertical plane, said angle α ranging from about 110° to about 180°.

7. A pulsation dampening device as recited in claim 3 wherein:
   said housing is generally cylindrical in shape.

8. A pulsation dampening device as recited in claim 3 wherein:
   said internal concave surface is generally conical.

9. A pulsation dampening device as recited in claim 3 wherein:
   said internal concave surface is generally spherical.

10. A pulsation dampening device as recited in claim 3 wherein:
    said internal concave surface is generally aspherical.

11. A pulsation dampening device as recited in claim 3 wherein:
    said internal concave surface is generally semi-cylindrical.

12. A pulsation dampening device with a high bubble purging efficiency comprising:
    (a) a generally cylindrical housing containing a first air chamber and a second air chamber, said generally cylindrical housing having a closed end and an open end and a cylindrical axis, said generally cylindrical housing positioned such that the cylindrical axis of said generally cylindrical housing is approximately horizontal;
    (b) an end cap attached to said open end, said end cap having an internal concave surface;
    (c) a diaphragm residing between said end cap and said generally cylindrical housing, said diaphragm normally residing in a generally vertical plane;
    (d) a fluid chamber defined by said internal surface and said diaphragm;
    (e) a fluid inlet port in said end cap positioned proximate a bottom peripheral portion of said end cap, said fluid inlet port directed generally perpendicular to said generally vertical plane;
    (f) a fluid outlet port in said end cap positioned proximate a top peripheral portion of said end cap, said fluid outlet port directed generally upward;
    (g) a first conduit connecting said first air chamber to said second air chamber;
    (h) a second conduit connecting said second air chamber to a voltage to pressure converter;
    (i) first means for regulating the flow of air through said first conduit; and
    j) second means for regulating the flow of air through said second conduit, said end cap, said fluid inlet, said fluid outlet, and said diaphragm resulting in said fluid chamber having a distributed non-preferred flow path therethrough.

13. A pulsation dampening device as recited in claim 12 further comprising:
    a pressure transducer for sensing fluid pressure of a fluid exiting said fluid outlet port, said pressure transducer sending a signal to said voltage to pressure converter.

* * * * *